United States Patent [19]

Corvette

[11] 4,161,682
[45] Jul. 17, 1979

[54] PORTABLE BATTERY CHARGER

[76] Inventor: William B. Corvette, Rte. #2 Hinton Rd., Covington, Ga. 30209

[21] Appl. No.: 792,470

[22] Filed: Apr. 29, 1977

[51] Int. Cl.² .......................... H02J 7/00; H01M 2/10
[52] U.S. Cl. ...................................... 320/2; 242/47.5;
339/29 B
[58] Field of Search ........................................ 320/2–5,
320/14, 48, 9–14, 20, 57; 242/47.5; 340/249,
282; 307/10 BP; 339/29 B

[56] References Cited

U.S. PATENT DOCUMENTS

| | | | |
|---|---|---|---|
| 2,242,749 | 5/1941 | Hope | 242/47.5 X |
| 2,421,828 | 6/1947 | Bruney | 320/48 X |
| 2,479,705 | 8/1949 | True | 320/48 X |
| 3,950,688 | 4/1976 | Sancey et al. | 320/2 |

*Primary Examiner*—Robert J. Hickey
*Attorney, Agent, or Firm*—Newton, Hopkins & Ormsby

[57] ABSTRACT

A portable battery charger having a housing surrounding an L-shaped frame on wheels, the bottom portion of the frame supporting a battery. Within the frame is a battery charger connected in charging parallel relationship to the battery. Jumper cables are connected through the housing to the battery and intermediate portions of the jumper cables and electrical supply cable within the housing are yieldably retracted by disc-shaped weights into parallel vertically disposed compartments. An electrical tilt alarm is provided to prevent spillage of electrolyte.

11 Claims, 3 Drawing Figures

PORTABLE BATTERY CHARGER

BACKGROUND OF THE INVENTION

1. Field of the Invention

This invention relates to a portable battery charger and is more particularly concerned with a battery charger for boosting and charging automotive and other vehicle batteries.

2. Background of the Invention

In the past, numerous battery chargers for automotive batteries have been devised. Usually such battery chargers are simply rectifiers mounted on wheels with cables, which are wrapped around cleats, supplied therewith. The cables become frayed, twisted, corroded and partially severed, as a result of use and often become lost if not permanently attached to the charger. The clamps of the cables often come in contact with each other and visual observations must be employed to assure that the right clamp is connected to the right terminal.

Usually a rectifier supplies so little current that it cannot be used, as a booster, to permit the cranking of the engine of an automobile while a battery cannot supply a sustained current sufficient to charge another battery.

The present invention overcomes or minimizes the difficulties described above.

SUMMARY OF THE INVENTION

Briefly described, the present invention comprises an elongated upstanding housing mounted on a frame. Wheels and a single foot, support the housing in an upright position, the wheels permitting tilting, by a handle, so that the housing can be readily rolled from place to place. Within the housing is a lead-acid wet cell battery and an a.c./d.c. rectifier, the battery being at the bottom for a low center of gravity.

On both sides of the battery and rectifier are vertical partitions carried by the frame, the partitions defining upwardly opening narrow cable receiving compartments. The jumper cables respectively loop through the compartments, as does the a.c. supply cable, the inner ends of the jumper cables being connected to the battery and rectifier and the inner ends of the a.c. cable being connected to the rectifier. The outer end of the jumper cables slideably protrude through spaced holes in the housing and terminate in terminal clamps. The a.c. supply cable protrudes through another hole in the housing and its external end is connected to a recepticle plug. A gravity switch in series with a horn signal, across the battery warns that the housing is tilted.

DETAILED DESCRIPTION OF THE PREFERRED EMBODIMENT

Figure 1:
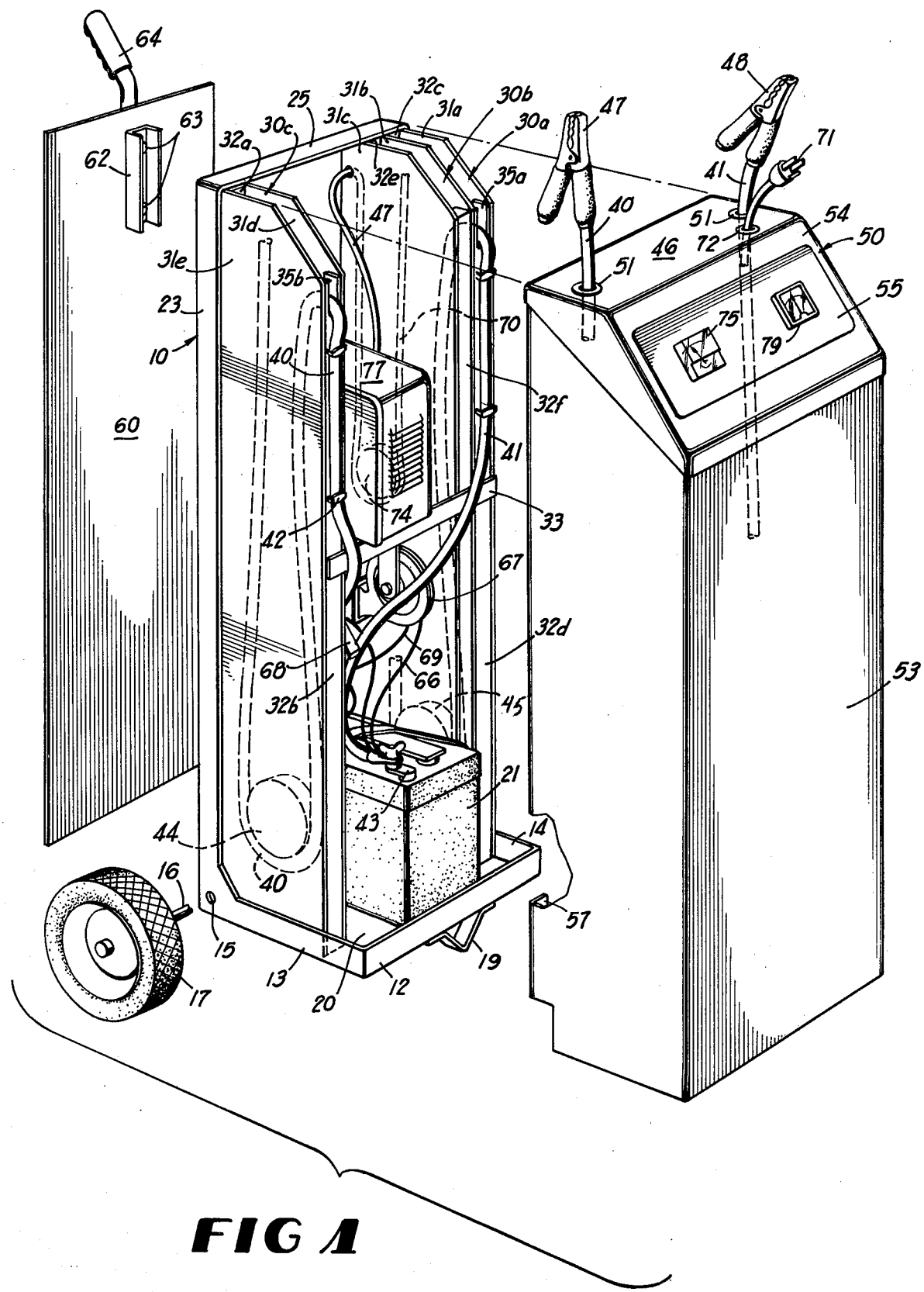
FIG. 1 is an exploded perspective view of a portable battery charger constructed in accordance with the present invention.
Figure 2:
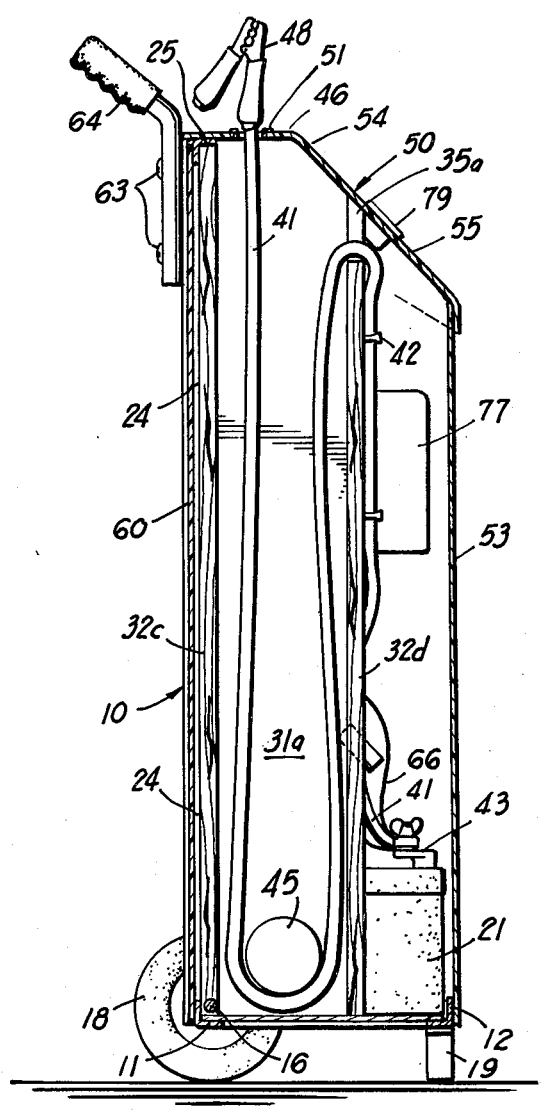
FIG. 2 is a vertical sectional view of the portable battery charger depicted in FIG. 1.

Referring now, in detail to the embodiment chosen for the purpose of illustrating the present invention, numeral 10, in FIGS. 1 and 2, denotes an L-shaped frame formed from angle iron. The frame 10 has a horizontal base formed by parallel, transverse rear and front cross bars 11 and 12, the ends of which are joined by parallel side bars 13 and 14.

A pair of transversely aligned holes, such as hole 15, in the side bars 13 and 14, adjacent to the rear bar 11, receives an axle or shaft 16, the ends of which rotatably receive wheels 17 and 18.

The central portion of the front cross bar 12 carries a downwardly extending V-shaped strap 19, the apex of which terminates in a plane with the lower periphery of wheels 17 and 18, parallel to the plane of the rectangular base frame, formed by the bars 11, 12, 13 and 14. Strap 19 thus forms a front foot or pedistal cooperating with the transversely spaced wheels 17 and 18 to support the portable battery charger in an upright position and yet permits tilting of the frame so that it can be rolled on wheels 17 and 18.

A flat wooden panel or battery supporting plate 20 within the upstanding edge of and carried by the bars 11, 12, 13 and 14, supports a lead-acid wet cell battery 21. The battery 21 is usually a 12 volt d.c. battery, even though other voltage batteries may be suitable for other applications.

Battery 21, being forwardly of axle 16, weights the frame 10 to its upright position, as shown in FIGS. 1 and 2. The fact that the battery 21 is in the lowermost portion of frame 11, provides for a low center of gravity for the charges and enhances its stability.

At the corners of the base frame, adjacent to axle 16, a pair of spaced upstanding parallel body angle iron bars 23 and 24, are provided, the upper ends of which are joined by an upper cross bar 25. Thus, a vertically disposed back frame is provided, perpendicular to the base frame and joined along the common cross bar 11.

For forming the cable receiving compartments 30a, 30b, and 30c, a plurality of vertically disposed, generally rectangular, spaced, parallel partition walls 31a, 31b, 31c, and 31d and 31e. As illustrated in FIG. 2, the walls 31d and 31e are spaced apart by a pair of spaced, vertically extending, spacer struts 32a, 32b on one side of battery 21. The three walls 31a, 31b and 31c are on the other side of the battery 21, being spaced apart by struts 32c, 32d, 32e and 32f.

The partition walls 31a, 31b, 31c, 31d, and 31e are about as long as the upright bars 23 and 24 and are received within the frame 10 as shown in FIG. 1. A cross bar 33 secures the forward struts 32b, 32f and 32d in their related positions.

The upper ends of front struts 32b and 32d are recessed at numerals 35a and 35b and respectively receive the upper bights of the intermediate portions of the jumper cables 40 and 41.

The inner or proximal ends of cables 40 and 41 are respectively attached by cable connectors, such as connector 43 to the positive and negative posts of the battery 21. The cables 40 and 41 extend upwardly from their connectors 43 and are fixed by staples 42 to the outside of front struts 32b and 32d. The cables 40 and 41 are then reversely turned over their respective struts and are thus received in recess 35a and 35b.

According to the present invention, intermediate portions of the jumper cables 40 and 41 respectively extend down into the spaced upwardly opening compartments 30a and 30c, these compartments being slightly wider than the diameter of the jumper cables 40 and 41 respectively. Hence, the jumper cables 40 and 41 form upwardly opening U-shaped loops, the lower end portions of which form bights for receiving thereon disc shaped weights 44 and 45.

The free distal end portions of the cables 40 and 41 extend outwardly through spaced holes in a horizontally disposed top plate 46 of a cover or housing, denoted generally by the numeral 50. Grommets 51 in the holes of top plate 46 permit the cables 40 and 41 to readily slide outwardly and inwardly with respect to the plate 46.

The ends of the cables 40 and 41 are provided with conventional battery terminal clamps 47 and 48 respectively. The clamps 47 and 48, however, are larger than the grommets 41 and hence arrest inward movement of the cables 40 and 41.

The cover or housing 40 is generally rectangular, having spaced parallel vertical sides 52 and a vertical front panel 53. The upper edge of the front panel 53 terminates below top plate 46 with their adjacent edges being joined by an inclined front panel 54 which carries an electrical display board 55.

The rear edges of the side panels 52 are provided with spaced opposed inwardly extending flanges, such as flange 57. Below the flanges, the side panels are notched in their lower corners, as at numeral 58, so as to clear the shaft 16 when the housing or cover 50 is placed over the frame 10. The bottom of cover 50 is open.

The back cover 60 is a flat rectangular panel covering the entire back of the upper frame of frame 10. The cover is removably secured by any convenient means to the vertical frame and is provided at its upper end portion with a handle 64, which protrude above the frame 10. The handle is in the central upper portion of panel 60, being secured in place by bolts 63 passing through a reinforcing bracket 62 and into the side of handle 60.

The cover 50 removably fits vertically down over the frame 10 so that flanges 57 are outwardly of panel 60.

Figure 3:
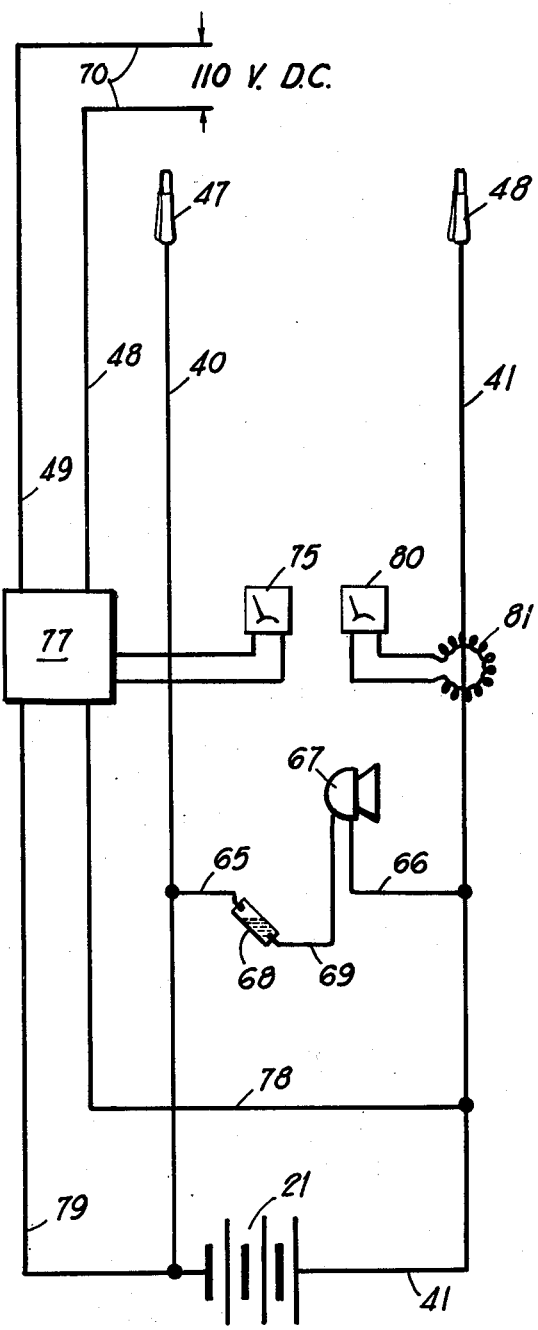
FIG. 3 is a wiring diagram of the electrical circuit of the portable battery charger depicted in FIGS. 1 and 2.

Referring specifically to the wiring diagram of FIG. 3, wires 65 and 66 are connected to opposite sides of the battery 21, these wires leading to a horn 67 and a gravity or mercury switch 68 which are connected, via wire 69, in series with each other so that when the mercury switch 68 is tilted, the horn or alarm 67 will be sounded. The horn 67 serves a dual function in that it warns of appreciable tilting of the battery charger so as to prevent the inadvertent spilling of electrolyte from the battery 21 and also functions as a theft alarm which, when the device is tilted sufficiently, by a person unfamiliar with it, that it will sound an alarm. The mercury switch 68 is mounted preferably on panel 30c while the horn 67 is carried by the crossbar 33, as shown in FIG. 1.

The a.c. current supply cable 70 which is provided with a supply socket plug 71 for supply 110 volts a.c. for the recharging of battery 21 via rectifier 77 and for supplying additional current to the cables 40 and 41 passes, as shown in FIG. 1, through a grommet 72 and, thence, down into the compartment 30b, the cable 70 also being provided with a lower bight which receives a disc shaped weight 74. The cable 74 contains the individual wires or cables 75 and 76 which lead to the rectifier or charger 77. Charger 77 is mounted on crossbar 33 above battery 21. An ammeter 75 indicates the number of amperes which the rectifier 77 is delivering to the battery 21 and when the battery is fully charged. The output of rectifier 77 is connected in parallel across battery 21 via wires 78 and 79, seen in FIG. 3.

As shown in FIG. 3, a second ammeter 80 is provided with a coil 81 which detects the flow of current through cable 41 so as to give a visual indication of the amount of current being delivered to a battery being charged or recharged. These ammeters 75 and 80 are respectively mounted in juxtaposition on the board 55, as shown in FIG. 1, for simultaneous observation.

When the cover 50 is installed, the hole or grommet 72 is vertically aligned with compartment 30b, the hole of one grommet 41 is vertically aligned with compartment 30a and the hole in the other grommet 51 is aligned with compartment 30c. These compartments 30a, 30b, 30c thus permit their respective cables to be selectively withdrawn. As each is withdrawn its associated weight will ride up and down in a rolling action, being confined by the panels 31a, 31b, 31c, 31d, 31e, as the case may be.

In operation, the charger of the present invention is periodically hooked up to an a.c. outlet by plugging in plug 71. The ammeter 75 will indicate when battery 21 is fully charged so that plug 71 can be unplugged. The cable 70 is readily pulled by the plug or distal end, out of its compartment 30b and its weight 74 will return it to the compartment 30b when the cable is released.

In the same fashion the cables 40 and 41 are removed for jumping across a discharged battery (not shown). These cables 40 and 41 too will automatically be returned to their compartments by weights 44 and 45 when the cables are released. The hot clamps 47 and 48 are held apart since the holes of grommets 41 are spaced apart. Hence, no shorting of battery 21 should occur.

It will be obvious to those skilled in the art that many variations may be made in the embodiment here chosen for the purpose of illustrating the present invention, and that full resort may be had to the doctorine of equivalents without departing from the scope of the present invention as defined by the appended claims.

I claim:

1. A portable battery charger comprising:
   (a) a housing having a plurality of parallel partitions defining parallel compartments, said housing being provided with a pair of spaced openings aligned respectively with said two of said compartments therein:
   (b) a battery disposed within a remaining compartment;
   (c) a battery charger disposed within remaining compartment and electrically connected to said battery;
   (d) battery charging cables having proximal ends directly electrically connected to said battery and said battery charger, intermediate portions of said cables being respectively received as U shaped loops in respective other of said compartments; the distal ends of said cables being slideably received in and extending outwardly respectively through said opening in said housing;
   (e) battery terminal clamps electrically connected to the ends of said cables, and being larger than said holes for arresting inwardly movement of said cables through said holes externally of said housing; and
   (f) means for yieldably urging said intermediate portions of said cables into said compartments sufficiently to yieldably hold said terminal clamps adjacent to their respective holes and in spaced apart condition.

2. The portable battery charger defined in claim 1 wherein said intermediate portions of said cables extending into said compartments form bights at the lower end portions thereof, and wherein said means for yieldably urging said intermediate portions of said cables into said compartments include weights which are received by the bights of the intermediate portions of said cables.

3. The portable battery charger defined in claim 2 wherein said weights are disc shaped members which are carried by said cables, the compartments of said housing having parallel panels which confine said wieght above the bights of said cables.

4. The portable battery charger defined in claim 1 wherein said housing includes a frame and wherein said battery is carried by the bottom portion of said frame and wherein said battery charger is disposed above said battery.

5. The portable charger defined in claim 1 including wheels mounted on said housing at the lower end portion thereof and a handle on said frame by means of which said portable charger may be moved from place to place.

6. A portable battery charger comprising:
(a) a housing having a plurality of compartments therein;
(b) a battery disposed within said housing;
(c) a battery charger disposed within said housing and electrically connected to said battery;
(d) battery charging cables having proximal ends electrically connected to said battery and said battery charger, intermediate portions of said cables being respectively received in said compartments; the distal ends of said cables extending outwardly of said housing;
(e) battery terminal clamps electrically connected to the ends of said cables, externally of said housing;
(f) means for yieldably urging said intermediate portions of said cables into said compartments; and
(g) an electrical actuated audible alarm connected electrically to said battery and switch means for actuating said alarm when said housing is tilted.

7. The portable battery charged defined in claim 6 wherein said switch is a mercury switch.

8. The portable battery charger defined in claim 1 wherein said housing includes a frame and a cover removably secured to said frame, and including a pair of ammeters carried by said housing, one of said ammeters detecting the amount of current supplied by said battery charger to said battery and the other ammeter detecting the amount of current supplied by said battery cables.

9. The portable battery charger defined in claim 1 including cable means extending through said housing and connected to said battery charger, said cable means also including a plug for connection of the battery charger to a source of a.c. current.

10. The portable battery charger defined in claim 9 wherein said cable means is slideably received through said housing and wherein an intermediate portion of said cable means is received in a compartment and including a weight carried by said cable means for yieldably returning said cable to said compartment.

11. The portable battery charger defined in claim 1 wherein said compartments are parallel to each other.

* * * * *